No. 843,515. PATENTED FEB. 5, 1907.
E. BIER.
PROCESS FOR ELECTRICALLY WELDING THE LONGITUDINAL JOINTS IN TUBULAR OBJECTS.
APPLICATION FILED SEPT. 10, 1906.
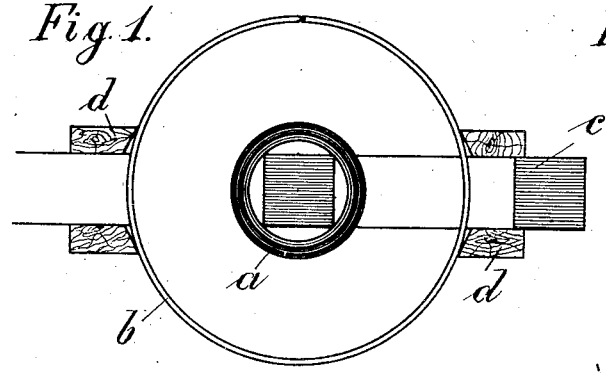
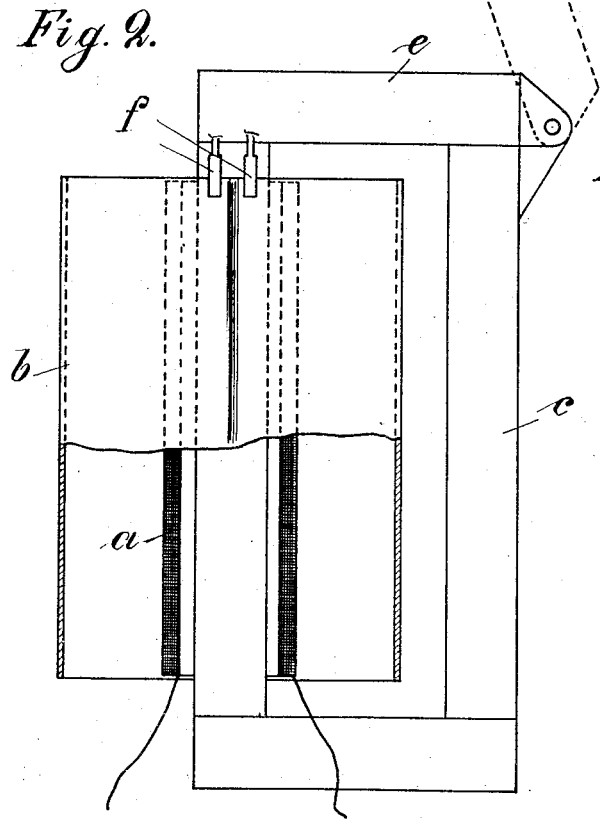
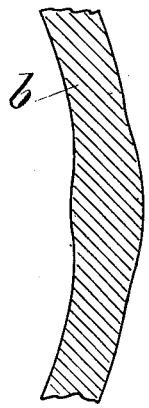

UNITED STATES PATENT OFFICE.

EMIL BIER, OF LONDON, ENGLAND.

PROCESS FOR ELECTRICALLY WELDING THE LONGITUDINAL JOINTS IN TUBULAR OBJECTS.

No. 843,515.     Specification of Letters Patent.     Patented Feb. 5, 1907.

Application filed September 10, 1906. Serial No. 333,914.

*To all whom it may concern:*

Be it known that I, EMIL BIER, a citizen of the German Empire, and a resident of London, England, have invented a new and useful process for electrically welding the longitudinal joints of tubular objects, such as boiler shells, tubes, pipes and the like, of which the following is a specification.

This invention relates to a process for electrically welding the longitudinal joints of tubular objects—such as boiler shells, tubes, pipes, and the like—by applying the alternating-current transformer, whereby secondary current in the object itself is produced, effecting at the joint to be welded the desired heat with the highest resistance.

In the accompanying drawings, Figure 1 is a plan view of an arrangement for welding a boiler-shell. Fig. 2 is a partly-sectioned front elevation. Fig. 3 is the prepared joint of a boiler-shell to be welded, and Fig. 4 is the welded joint.

*a* is the primary coil, being pushed over one pole-piece of the magnetic frame *c*.

*b* is the object to be welded together, the longitudinal edges of which are suitably prepared, as shown in Fig. 3.

*e* is the armature, being hinged to the magnetic frame *c*, so that it can be lifted up when the object is to be pushed over the respective pole-piece of the magnetic frame.

In order to press the longitudinal edges of the object to be welded together against each other, an adjustable clamping device *d* is provided, by means of which the pressure is transmitted to the joint, and thus the edges become forced together by a power of about one-horse power. In order to maintain the edges being welded together at all partitions in a close contact, tongs *f* are provided, by means of which a slight to-and-fro motion to the edges in their longitudinal direction is imparted.

The operation, respectively the welding, takes place as follows: The alternating current flowing through the primary coil *a* produces in the object to be welded together, which is to be thought as the secondary coil, a current, on account of which a warming of the object to be welded together takes place. The highest resistance is produced at the angle-point of the edges, as shown in Fig. 3, where the heating is the highest one. With the increase of the temperature the resistance is increased as well, so that the longitudinal edges of the boiler-shell or the like are at last in welding heat and the welding simultaneously on the whole length of the edges of the object takes place. After the welding the joint has the appearance as shown in Fig. 4.

Having now fully described my invention, what I claim, and desire to secure by Letters Patent, is—

1. A process for electrically welding the longitudinal joints of tubular objects, such as boiler-shells, tubes, pipes and the like, by means of induction-current, produced within the tubular objects consisting in that the tubular object embodies the secondary coil of an alternating-current transformer, substantially as described and shown and for the purpose set forth.

2. In a process for electrically welding the longitudinal joints of tubular objects, such as boiler-shells, tubes, pipes and the like, by means of induction-current produced within the tubular objects, the longitudinal edges of said objects being formed to obtuse angles and pressed against each other during the welding process, substantially as described and shown and for the purpose set forth.

3. In a process for electrically welding the longitudinal joints of tubular objects, such as boiler-shells, tubes, pipes and the like, by means of induction-current produced within the tubular objects, the combination of means by which besides the tangential pressure, a slight to-and-fro motion is imparted to the edges to be welded, substantially as described and shown and for the purpose set forth.

In testimony whereof I have hereunto set my hand in the presence of two subscribing witnesses.

EMIL BIER.

Witnesses:
   OTTO KLAUSER,
   H. D. JAMESON.